United States Patent
Köhler et al.

(10) Patent No.: US 7,073,479 B2
(45) Date of Patent: Jul. 11, 2006

(54) METHOD FOR OPERATING AN INTERNAL COMBUSTION ENGINE WITH DIRECT FUEL INJECTION

(75) Inventors: Bernd Köhler, Donzdorf (DE); Michael Oechsle, Sindelfingen (DE); Oliver Platzek, Ohmden (DE)

(73) Assignee: Daimler Chrysler AG, Stuttgart (DE)

( * ) Notice: Subject to any disclaimer, the term of this patent is extended or adjusted under 35 U.S.C. 154(b) by 0 days.

(21) Appl. No.: 11/200,533

(22) Filed: Aug. 9, 2005

(65) Prior Publication Data

US 2006/0000440 A1    Jan. 5, 2006

Related U.S. Application Data

(63) Continuation-in-part of application No. PCT/EP03/14895, filed on Dec. 24, 2003.

(30) Foreign Application Priority Data

Feb. 12, 2003    (DE) ............... 103 05 941

(51) Int. Cl.
*F02B 1/10*    (2006.01)
(52) U.S. Cl. .............. 123/295; 123/299; 60/284
(58) Field of Classification Search ............. None
See application file for complete search history.

(56) References Cited

U.S. PATENT DOCUMENTS

| 6,345,499 B1 | 2/2002 | Nishimura et al. |
| 6,393,832 B1 * | 5/2002 | Kolmanovsky et al. ....... 60/286 |

FOREIGN PATENT DOCUMENTS

| EP | 0 856 655 | 8/1998 |
| EP | 1 004 762 | 5/2000 |
| EP | 1 030 046 | 8/2000 |

* cited by examiner

*Primary Examiner*—Andrew M. Dolinar
(74) *Attorney, Agent, or Firm*—Klaus J. Bach

(57) ABSTRACT

In a method of operating an internal combustion engine with direct fuel injection such that, in the engine startup period, a three-way catalytic converter disposed in the engine exhaust system is rapidly heated to a working temperature, in that a fuel quantity which is injected is injected in two separate injection steps with the first fuel volume being injected during the intake stroke and the second fuel volume being injected during the expansion stroke so as to form immediately before the ignition instant a rich stratified charge cloud in the region of the spark plug thereby ensuring reliable ignition of the stratified cloud while, overall, achieving a lean fuel/air mix in the combustion chamber.

8 Claims, 4 Drawing Sheets

METHOD FOR OPERATING AN INTERNAL COMBUSTION ENGINE WITH DIRECT FUEL INJECTION

This is a Continuation-in-Part Application of International Application PCT/EP03/14895 filed 24 Dec. 2003 and claiming the priority of German application 103 05 941.5 filed 12 Feb. 2003.

BACKGROUND OF THE INVENTION

The invention relates to a method for operating a spark-ignition internal combustion engine having a combustion chamber, a fuel injector arranged in the combustion chamber and an ignition source for igniting a fuel/air mix formed in the combustion chamber, part of the fuel quantity which is introduced into the combustion chamber being injected as a pre-injection during an intake stroke of the internal combustion engine.

During a startup phase of a spark-ignition internal combustion engine with direct injection of fuel, the internal combustion engine, following a cold start, is operated with a rich charge mix to ensure sufficient reliability of ignition of a mix formed in the combustion chamber and to heat a catalytic converter device provided for the exhaust gas treatment. This also allows the internal combustion engine to run more smoothly.

With the previously known methods for heating up an exhaust-gas catalytic converter for a direct injection spark-ignition engine, the heat-up phase of the exhaust-gas catalytic converter which is required until a light-off temperature of the exhaust gas catalytic converter is reached during cold-start operation is too long. The light-off temperature is the temperature or temperature range at or in which a significant conversion rate is achieved by the catalytic converter, e.g. between 20% and 50%, i.e. when significant conversion of hydrocarbons, carbon monoxide and nitrogen oxides begins.

It is the object of the invention to provide a method for operating the internal combustion engine in such a manner that an exhaust-gas catalytic converter of the internal combustion engine is heated up rapidly during a cold-start phase.

SUMMARY OF THE INVENTION

In a method of operating an internal combustion engine with direct fuel injection such that, in the engine startup period, a three-way catalytic converter disposed in the engine exhaust system is rapidly heated to a working temperature, in that a fuel quantity which is injected is injected in two separate injection steps with the first fuel volume being injected during the intake stroke and the second fuel volume being injected during the expansion stroke so as to form immediately before the ignition instant a rich stratified charge cloud in the region of the spark plug thereby ensuring reliable ignition of the stratified cloud while, overall, achieving a lean fuel/air mix in the combustion chamber.

The pre-injection quantity is used to form a homogeneous fuel/air mix with a fuel/air ratio $\lambda$ of greater than 1 in the combustion chamber, then in an expansion stroke of the internal combustion engine, the second fuel quantity injected into the combustion chamber, which is the main injection quantity, is in the form of a stratified fuel/air mix cloud with a fuel/air ratio $\lambda$ of less than 1 in the vicinity of the ignition source, and then, preferably after the end of injection of the main injection quantity, the stratified fuel/air mix cloud is ignited. The method according to the invention is preferably used in a spark-ignition internal combustion engine with direct fuel ignition which is operated using a jet-controlled combustion method.

During a cold-start phase, the fuel quantity which is injected into the combustion chamber is divided into two injection quantities. The first injection takes place in the intake stroke of the internal combustion engine. The purpose of the first injection or preinjection in the intake stroke is to form a lean fuel/air mix throughout the entire combustion chamber, preferably with a fuel/air ratio $\lambda \approx 1.6$. The main injection quantity, which is effected as what is known as a stratified injection, provides a stratified charge cloud in the region of the ignition source. This provides a fuel/air mix cloud with a fuel/air ratio $\lambda$ of less than 1 in the form of a stratified charge cloud in the region of the ignition source, in such a manner that reliable ignition of this charge cloud is ensured even in the event of a late ignition instant. It is preferable for an overall fuel/air ratio $\lambda$ of around 1.05 to be provided in the combustion chamber as a whole by the total fuel quantity, i.e. preinjection quantity and main injection quantity together. This allows complete re-oxidation of the entire quantity of fuel, for example in the exhaust pipe or exhaust manifold of the internal combustion engine, without the use of secondary air injection.

In one configuration of the method according to the invention, the preinjection quantity is injected into the combustion chamber in a range between 330° CA (crank angle) and 220° CA before ignition top dead center ITDC. This ensures that the preinjected fuel quantity is distributed through the combustion chamber in good time, so that a lean fuel/air mix is formed throughout the combustion chamber prior to the ignition instant of the main injection quantity.

According to a further configuration of the invention, the main injection quantity is injected into the combustion chamber in a range between 10° CA and 30° CA after ITDC. A main injection of this type allows reliable ignition of the stratified mix cloud at a late ignition instant. Accordingly, a high exhaust gas temperature is generated, and a relatively late end of combustion is achieved, since the main injection according to the injection and the late ignition instant achieve a late main combustion. The main combustion point is the piston position at which 50% of the fuel quantity has been converted or already burnt. The high exhaust gas temperatures achieved as a result, and a slight excess of oxygen, promote the re-oxidation of CO and HC both in the exhaust system and in the catalytic converter. The latter is preferably designed as an end wall catalytic converter. The high exhaust gas temperature and the reoxidation of CO and HC in the catalytic converter interact in such a manner that accelerated heating of the catalytic converter can be achieved. As a result, the catalytic converter reaches its light-off temperature within a few seconds.

In a further configuration of the invention, the stratified fuel/air mix cloud is ignited in a range between 2° CA and 10° CA after the end of the main injection of the main quantity of fuel. Since the stratified charge is predetermined by the nozzle shape when using a jet-controlled combustion method, stable charge stratification and a greater freedom in selecting the ignition instant are made possible at all the injection instants of the injection of the main fuel quantity.

According to a further configuration of the invention, a third fuel quantity is injected into the combustion chamber as an after-injection quantity after ignition of the stratified fuel/air mix cloud. The third fuel quantity, which is injected into the hot combustion gases during the expansion stroke, supplies further chemical energy to the exhaust gas. Accordingly, the exhaust gas temperatures are increased still further by means of complete reoxidation.

In a further configuration of the invention, a heat-up phase of a catalytic converter provided for the exhaust gas after-treatment is controlled by presetting a fuel quantity ratio between the preinjection quantity and the main injection quantity as a function of the operating point, so that the end of the catalytic converter heat-up phase is determined from the heat of reaction which is released during the oxidation of the preinjection quantity which is dependent on the operating point. This avoids unnecessary lengthening of the catalytic converter heat-up phase.

According to a further configuration of the invention, the torque output of the internal combustion engine is controlled by the main injection quantity and the fuel quantity ratio between the preinjection quantity and the main injection quantity so as to optimize the running smoothness of the internal combustion engine during the catalytic converter heat-up phase.

According to a particular configuration of the invention, the fuel ratio of the preinjection quantity to the main injection quantity is selected to be between 0.4 and 0.6. This ensures that the internal combustion engine runs sufficiently smoothly even with a late ignition setting.

The invention will be described in more detail below on the basis of the accompanying drawings:

DESCRIPTION OF PREFERRED EMBODIMENTS

Figure 1:
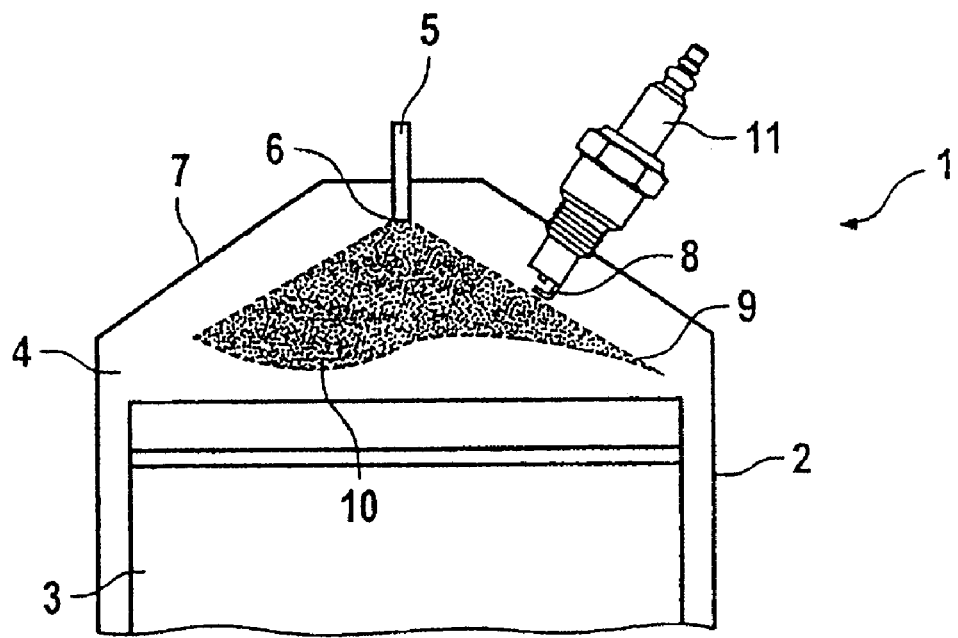
FIG. 1 shows a cylinder cross section of a direct injection internal combustion engine with spark ignition.

FIG. 1 shows a cylinder 2 of a spark-ignition internal combustion engine 1 with direct fuel injection, in which a piston 3 arranged so as to be longitudinally movable, together with a cylinder head 7 which closes the cylinder 2, delimits a combustion chamber 4. A fuel injector 5, from which fuel is injected into the combustion chamber 4 in the form of a fuel cone 9 through a nozzle opening 6, is arranged centrally in the cylinder head 7. A control device (not shown), during a starting phase of the internal combustion engine 1, determines the injection instants for the fuel and the associated fuel quantities, as well as an ignition instant at which a fuel/air mix formed in the combustion chamber 4 is ignited by means of an ignition source 11 (spark plug or the like). When the nozzle opening 6 is opened, the fuel is injected into the combustion chamber 4 in the form of a conical jet 9, in such a manner that the electrodes 8 of the spark plug 11 arranged in the cylinder head 7 remain substantially unwetted.

The fuel jet 9 is injected into the combustion chamber 4 with a cone angle of between 70° and 110°. The positioning of the spark plug in the combustion chamber is selected in such a manner that the electrodes 8 of the spark plug 11 are not wetted by the fuel which is injected.

The internal combustion engine 1 illustrated in FIG. 1 operates according to the four-stroke principle: In a first stroke of a working cycle of the internal combustion engine, known as the intake stroke, combustion air is fed to the combustion chamber 4 through an intake port (not shown). In the process, the piston 3 moves downwards to a bottom dead center (BDC) position. In a following compression stroke of the internal combustion engine, the piston 3 moves upwards from the bottom dead center (BDC) position to an ignition top dead center (ITDC) position. In a subsequent expansion stroke, the piston moves downwards to the bottom dead center BDC position, while in a fourth exhaust stroke the piston 3 moves again upwards to the top dead center (TDC) position, discharging the exhaust gases from the combustion chamber 4.

It is an object of the method according to the invention to heat up an oxidation catalytic converter of the internal combustion engine as quickly as possible after a cold start, in such a manner that an emission conversion rate at the catalytic converter reaches its maximum level within a short time. In the intake stroke of the internal combustion engine, a first fuel quantity is injected as a preinjection quantity $M_{VE}$ in accordance with FIG. 4. As a result, a homogeneous fuel/air mix with a fuel ratio $\lambda$ of greater than 1 is formed in the combustion chamber 4. The purpose of this preinjection is to provide a lean fuel/air mix, preferably with a fuel ratio $\lambda \approx 1.6$.

In an expansion stroke of the internal combustion engine, a second fuel quantity is injected into the combustion chamber as a main injection quantity $M_{HE}$. The second injection is realized as a stratified injection, i.e. it is injected into a combustion chamber with a high back pressure. As a result, a rich stratified charge cloud 10 with $\lambda$ less than 1 is formed in the region of the spark plug, this cloud being located at the spark plug 11 at the ignition instant. This ensures reliable ignition of the charge in the combustion chamber 4, in particular in the event of a relatively late ignition instant, for example at 30° CA after ITDC. The method according to the invention is particularly suitable for use in direct-injection internal combustion engines with spark ignition which use a jet-controlled combustion method, since a combustion method of this type allows a very late ignition instant. Furthermore, the fuel quantity which is injected can be divided into at least two partial injections during a cold start.

It is preferable for injection nozzles 6 which open outward to be used in these internal combustion engines with a jet-controlled combustion method. Accordingly, the fuel is introduced into the combustion chamber 4 as a hollow fuel cone 9 with an angle of between 70° and 110°, so that the hollow fuel cone 9 meets a charge which has been compressed in the combustion chamber during a fuel injection shortly after ITDC. This forms a toroidal swirl in the outer region of the hollow cone 9 or at the edge of the hollow fuel cone 9 which has been injected, so that an ignitable air mix is provided in the region of the electrodes 8 of the spark plug 11. The spark plug is arranged in such a manner that the electrodes 8 of the spark plug 11 project into the edge swirl which has been produced without them being significantly wetted during the fuel injection.

According to the present invention, the overall mix in the combustion chamber should be slightly lean, preferably with an overall fuel/air ratio $\lambda \approx 1.05$. The interaction of ignition, combustion and re-oxidation of the HC and/or CO emissions in the exhaust system, in particular in the case of a jet-controlled combustion method, allows complete oxidation of the total fuel quantity injected without secondary air having to be blown in.

In accordance with FIG. 1, a rich charge cloud 10, preferably with a fuel/air ratio $\lambda \approx 0.8$, is present in the region of the electrodes 8 of the spark plug 11 at the ignition instant ZZP, while in the remainder of the combustion chamber 4, outside the rich charge cloud 10, there is preferably a lean mix with a fuel/air ratio $\lambda \approx 1.6$. The result is reliable ignition, so that the internal combustion engine runs smoothly even in the event of a late ignition instant ZZP. A shift in the ignition instant ZZP to an extremely late position of up to 30° CA after ITDC is thus possible with sufficiently smooth running of the engine. This is achieved by the injection timing of the stratified injection coupled to the ignition instant ZZP, i.e. the interval between the ignition instant ZZP and the ignition timing of the stratified injection remains constant.

In the case of a jet-controlled combustion method being used in the direct-injection internal combustion engine, the end of injection of the stratified injection is, for example, approx. 2° CA before the ignition instant ZZP. The injection takes place at extremely late ignition instants, i.e. in the working stroke or in the expansion stroke. This link between ignition and injection means that the mix formation conditions in the rich charge cloud 10 are virtually equal for all ignition instants. In particular at an operating point with an engine speed of 1200 rpm and at an air intake pressure of 800 mbar, the ignition takes place at 30° CA after ITDC, with an overall fuel/air ratio $\lambda=1.05$ being present in the combustion chamber 4. At an operating point of this type, it is preferable for the preinjection to take place at 260° CA before ITDC and for the main injection to take place at 25° CA after ITDC.

The mix formation, by virtue of a high injection pressure, is in this case dependent primarily on the primary fuel mixture preparation by the injector 5. The reliability of ignition is substantially dependent on the charge stratification at the ignition instant ZZP. In the case of a jet-controlled combustion method, the charge stratification is predetermined by the jet shape. Injection at a defined piston position, as in the case of a wall-controlled combustion method, is not required in this case. This allows stable charge stratification at all injection instants and therefore a greater freedom of choice with respect to the ignition and injection instants. This freedom of choice with respect to the ignition instant in conjunction with the reliability of ignition which is achieved and the smooth running at extremely late ignition instants allows different catalytic converter heat-up strategies to be implemented.

The method according to the invention is performed in the following way. The injection of the preinjection quantity $M_{VE}$ in the intake stroke produces a lean fuel/air mix in the overall combustion chamber 4. This makes available a sufficient supply of hydrocarbon molecules for the reoxidation. Injection of the main injection quantity $M_{HE}$ leads to the formation of a charge cloud 10 with a rich fuel/air mix in the region of the spark plug 11.

This provides for rapid combustion of the rich mix in the region of the spark plug 11, with the combustion of the stratified charge 10 being substantially concluded by the time an exhaust valve opens. Only a small part of the lean mix which fills the remainder of the combustion chamber 4 takes part in the combustion. Since the combustion rate is greatly slowed in the region of the lean mix, the contribution made to the generation of torque by the lean combustion chamber regions is negligible. The hydrocarbons in the lean combustion chamber regions are discharged through the opening exhaust valve.

The combustion of the rich mix produces a large quantity of CO emissions. These CO emissions are then reoxidized together with the hydrocarbons from the lean regions during the exhaust phase. The overall lean fresh mix in the combustion chamber means that a sufficient excess of oxygen is available for the re-oxidation.

Furthermore, the late ignition instant ZZP produces a high exhaust gas temperature, since the late ignition instant ZZP leads to a shift in the center point of the main combustion in the late direction and a late end of combustion. The conditions which prevail, in the form of high exhaust gas temperatures and oxygen excess, promote the reoxidation of CO and HC both in the exhaust system, i.e. in the exhaust pipe and exhaust manifold, and finally, in the catalytic converter. The heat of reaction which is liberated in the process further increases the exhaust gas temperature. The high exhaust gas temperature and the oxidation of CO and HC in the catalytic converter itself accelerate the heating-up of the catalytic converter, which therefore reaches its light-off temperature within a few seconds.

Figure 2:
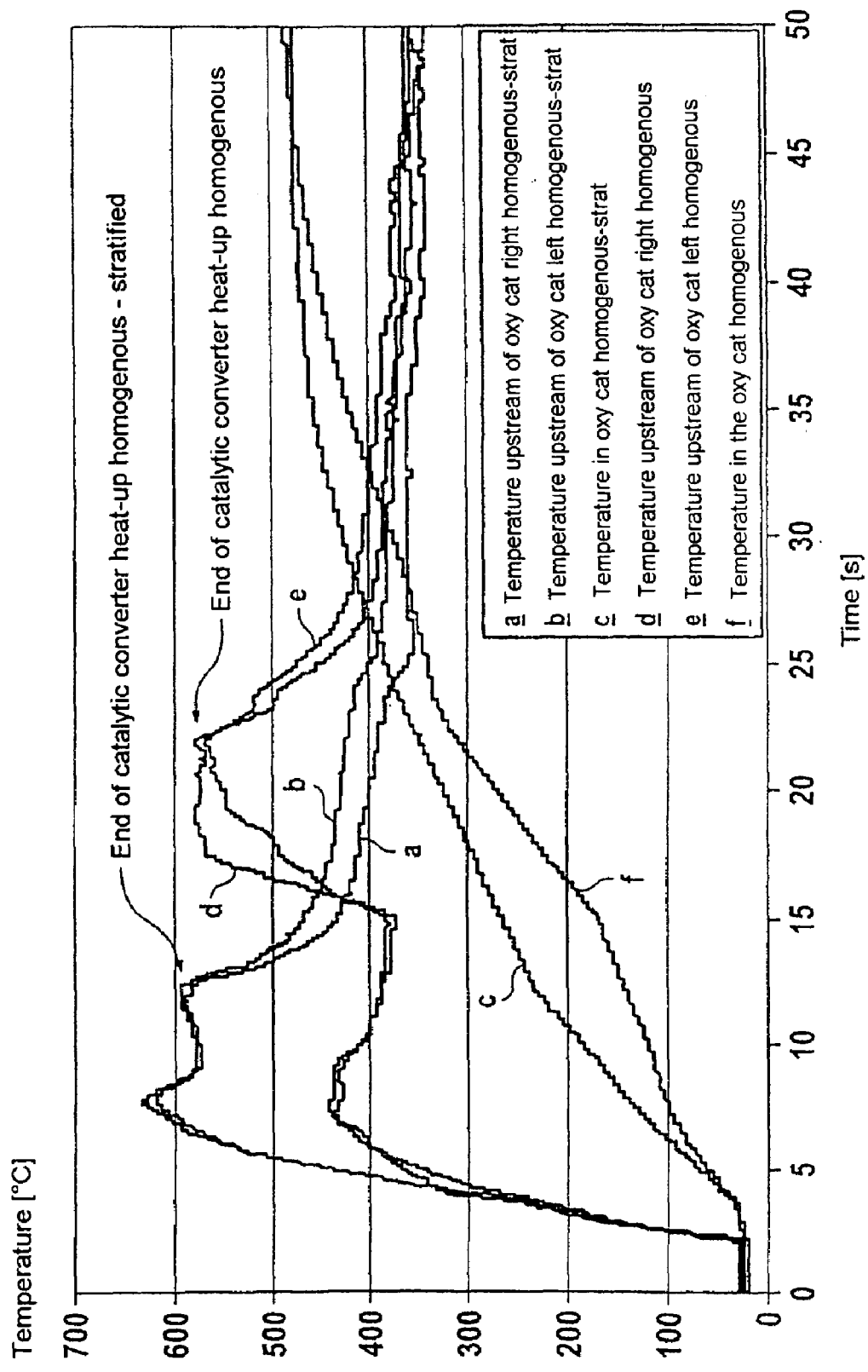
FIG. 2 shows in a diagram the temperature of an oxidation catalytic converter of the internal combustion engine shown in FIG. 1 during cold-start operation, plotted over time.

FIG. 2 shows exhaust gas temperatures which have been measured upstream of or in the downstream catalytic converter during measurement of emissions during a cold start. The measurement sequence corresponds to the first seconds of the EU98A cycle. It will be clear that the late ignition instant in combination with the effective reoxidation of the carbon monoxide from the rich mix cloud and of the hydrocarbons from the regions with a lean fresh mix provide very high flows of exhaust-gas heat for heating up the catalytic converter. This greatly shortens the time required to reach the light-off temperature of the catalytic converter compared to the measurement with homogeneous catalytic converter heating with a late ignition instant.

Figure 3:
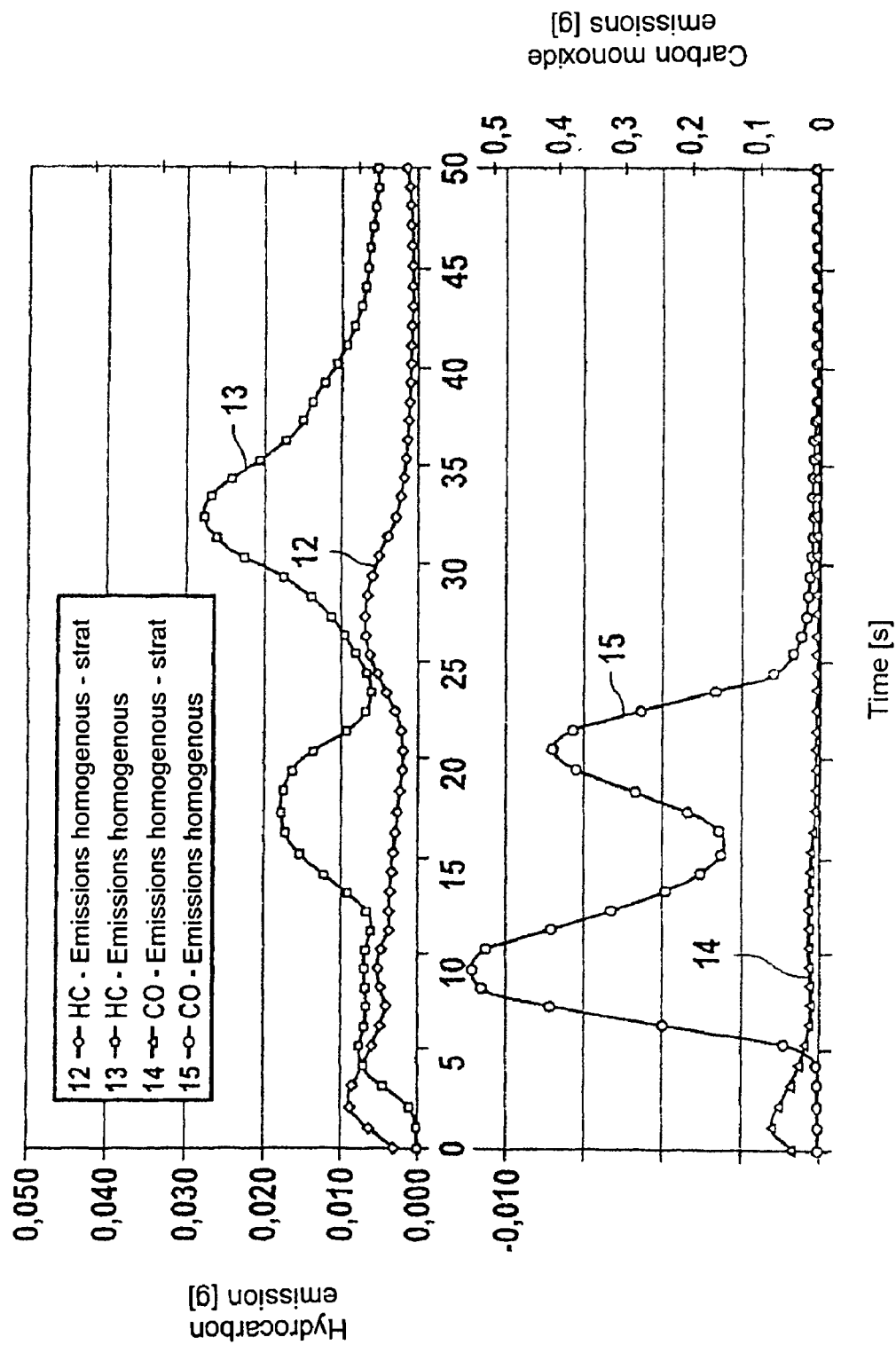
FIG. 3 shows in a diagram the emission curve of the internal combustion engine, in particular for the HC and CO emissions, plotted over time.

FIG. 3 shows the pollutant emissions associated with the measurement shown in FIG. 2, measured with a CVS measurement installation used for exhaust gas tests. This clearly reveals in particular the low emission of hydrocarbons immediately after the cold start. The hydrocarbons from the lean regions of the combustion chamber 4 are virtually completely oxidized. The carbon monoxide emissions from the rich charge regions are also largely oxidized. The high CO emissions with homogenous heating of the catalytic converter are caused by the enrichment which is necessary during a cold start. This is necessary in order to achieve sufficiently smooth running with homogenous engine operation. On account of the catalytic converter being ready for operation after just 11 seconds in the first acceleration phase, a considerable reduction in emissions is obtained.

Figure 4:
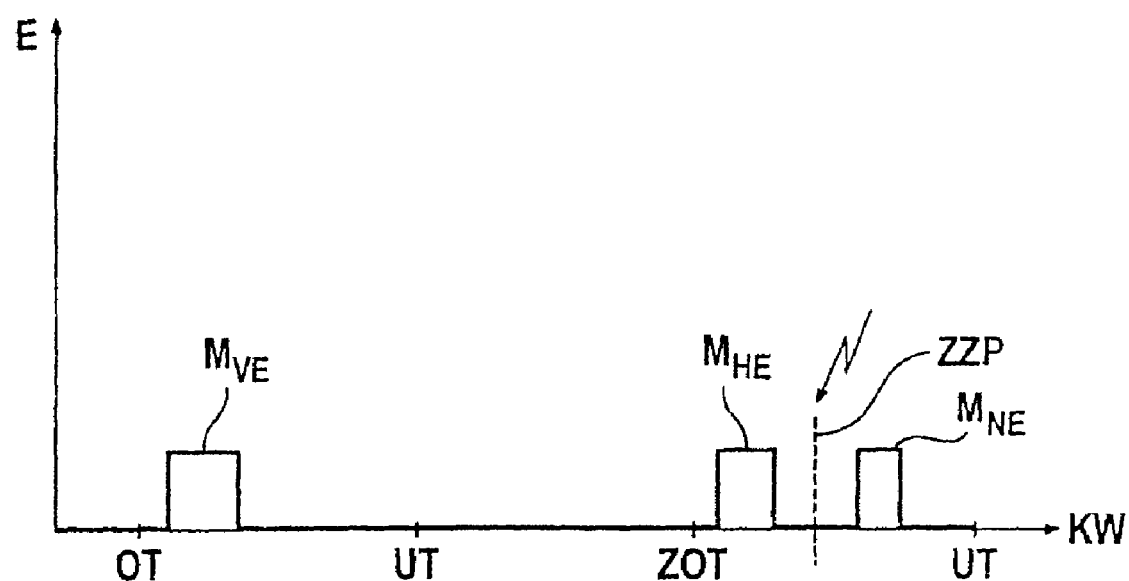
FIG. 4 shows in a diagram the injection profile of the internal combustion engine shown in FIG. 1 during a cold start, plotted over the crank angle.

Alternatively, further chemical energy can be supplied by a third injection of a fuel afterinjection quantity $M_{NE}$ in accordance with FIG. 4, which is injected into the hot combustion gas during the working stroke. The ambient conditions prevailing in the exhaust pipe cause the afterinjection quantity $M_{NE}$ to be completely reoxidized. However, a precondition for this is that there be a sufficient excess of oxygen. If three injections are used, it becomes more difficult to form a lean overall fuel/air ratio, with the result that the oxygen required is then preferably supplied by blowing in secondary air into the exhaust system downstream of an exhaust valve.

It is preferable for the fuel to be injected directly into the combustion chamber as a function of an engine speed, a load point, a camshaft position or an intake pipe pressure. The fuel/air ratio which is formed in the combustion chamber 4 by the preinjection quantity $M_{VE}$ is dependent on operating point but is not ignitable. The fuel/air ratio formed by the preinjection quantity $M_{VE}$ determines the reaction heat released during the re-oxidation.

The present method provides for the output of torque from the internal combustion engine to be dependent on the main injection quantity $M_{HE}$. The ignition instant ZZP can be linked to the end of the main injection as a function of operating point, i.e. the time interval between the ignition instant ZZP and the end of injection of the main injection quantity $M_{HE}$ remains constant. This increases the reliability of ignition and the smooth running of the internal combustion engine. It is preferable for the injection of the afterinjection quantity $M_{NE}$ to be carried out after the ignition of the mix, with this injection taking place either at a constant time interval after the ignition instant ZZP or at a fixed injection instant, depending on the operating point, i.e. it is linked either to the ignition instant ZZP or to the crank angle as a function of the operating point.

The after-injection quantity $M_{NE}$ serves to introduce additional energy into the exhaust section. It is conceivable for secondary air to be blown into the exhaust manifold when using an after-injection quantity $M_{NE}$. This further accelerates the heating-up of the three-way end-wall catalytic converter if excess fuel is present in the exhaust gas.

Alternatively, the heating-up of the catalytic converter can be controlled by stipulating a predetermined quantitative fuel ratio $M_{VE}/M_{HE}$ between the preinjection quantity $M_{VE}$ and the main injection quantity $M_{HE}$. This ratio $M_{VE}/M_{HE}$ is preferably selected to be between 0.4 and 0.6. This allows the end of the catalytic converter heat-up phase to be calculated directly, as a function of operating point, from the preinjection quantity.

It is preferable for the output of torque from the internal combustion engine to be controlled by the main injection. This takes place as a function of a preset torque which is calculated taking account of the predetermined quantitative fuel ratio $M_{VE}/M_{HE}$ between the preinjection quantity $M_{VE}$ and the main injection quantity $M_{HE}$. It is conceivable that the torque output from the internal combustion engine is corrected directly by the main injection quantity $M_{HE}$, in order to determine the preinjection quantity $M_{VE}$ participating in the combustion.

The injection times for the preinjection, main injection and after-injection quantities illustrated in FIG. 4 are illustrated purely by way of example; the injection times can be selected as a function of the operating point and can be varied as a function of a predetermined torque output.

The present method is suitable in particular for optimum heating of a three-way final catalytic converter, in particular in a spark-ignition engine with a jet-controlled combustion method, for achieving rapid heating of the catalytic converter to a working temperature for the conversion of hydrocarbons, carbon monoxide and nitrogen oxides with minimal emissions of pollutants. As the emissions are minimized a low fuel consumption mode can be followed shortly after the engine has been started. A fuel quantity which is injected during a cold start is divided into two injections; a third injection can be carried out during the expansion stroke. The purpose of this is to achieve a lean fuel/air mix in the combustion chamber overall. The second injection is carried out as a stratified fuel injection immediately before the ignition instant ZZP, providing a rich stratified charge cloud in the region of the spark plug, so that the stratified charge cloud can be ignited reliably.

The invention claimed is:

1. A method of operating a spark-ignition internal combustion engine with direct fuel injection including a combustion chamber with a fuel injector, and an ignition source, said method comprising the steps of:
    feeding combustion air to a combustion chamber of the engine,
    injecting a first fuel quantity as a pre-injection quantity ($M_{VE}$) in an intake stroke of the internal combustion engine, such that a homogeneous fuel/air mix with a fuel/air ratio ($\lambda$) of greater than 1 is formed in the combustion chamber,
    then injecting in an expansion stroke of the internal combustion engine a second fuel quantity into the combustion chamber as a main injection quantity ($M_{HE}$), so as to form a stratified fuel/air mix cloud with a fuel/air ratio ($\lambda$) of less than 1 in the vicinity of the ignition source,
    and then, after the end of injection of the main injection quantity ($M_{HE}$), igniting the stratified fuel/air mix cloud.

2. The method as claimed in claim 1, wherein the pre-injection quantity ($M_{VE}$) is injected into the combustion chamber in a range of between 330° CA and 220° CA before ignition top dead center (ITDC).

3. The method as claimed in claim 1, wherein the main injection quantity ($M_{HE}$) is injected into the combustion chamber in a range between 10° CA and 30° CA after ITDC.

4. The method as claimed in claim 1, wherein the ignition of the stratified fuel/air mix cloud takes place in a range between 2° CA and 10° CA after the end of the main injection quantity ($M_{HE}$).

5. The method as claimed in claim 4, wherein, after the stratified fuel/air mix cloud has been ignited, a third fuel quantity is injected into the combustion chamber as an after-injection quantity ($M_{NE}$).

6. The method as claimed in claim 1, wherein a heat-up phase of a catalytic converter provided for the exhaust gas aftertreatment is controlled by presetting a fuel quantity ratio ($M_{VE}/M_{HE}$) between the preinjection quantity ($M_{VE}$) and the main injection quantity ($M_{HE}$) as a function of the engine operating point, so that the end of the catalytic converter heat-up phase can be determined from a reaction heat, which is released during the oxidation of the preinjection quantity ($M_{VE}$) which is dependent on the engine operating point.

7. The method as claimed in claim 6, wherein the torque output of the internal combustion engine is controlled by adjustment of the main injection quantity ($M_{HE}$) and the fuel quantity ratio ($M_{VE}/M_{HE}$).

8. The method as claimed in claim 6, wherein the quantitative fuel ratio ($M_{VE}/M_{HE}$) of the preinjection quantity ($M_{VE}$) to the main injection quantity ($M_{HE}$) is selected to be between 0.4 and 0.6.

* * * * *